Feb. 8, 1949.  F. C. TOETTCHER ET AL  2,461,453
MANUFACTURE OF LUBRICATING OIL
Filed May 4, 1945   2 Sheets-Sheet 1
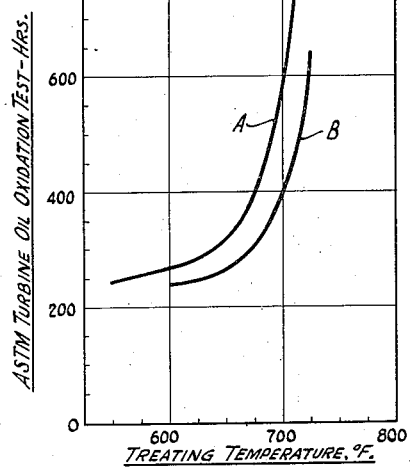
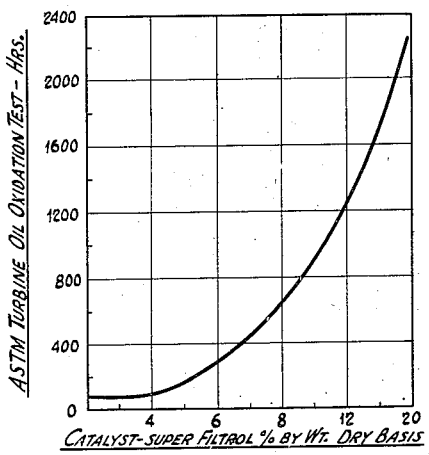
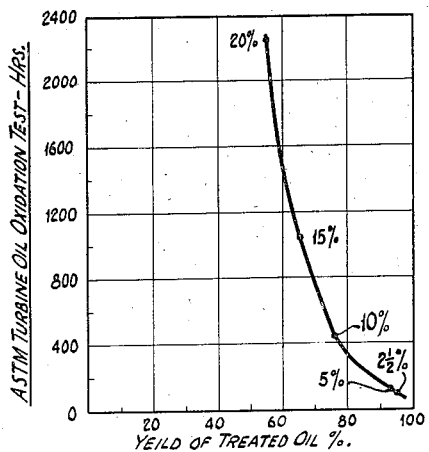
INVENTORS.
FRED C. TOETTCHER.
and JOHN R. COLEY.
BY
ATTORNEY.

INVENTORS
FRED C. TOETTCHER.
& JOHN R. COLEY.
BY
ATTORNEY.

Patented Feb. 8, 1949

2,461,453

UNITED STATES PATENT OFFICE 2,461,453

MANUFACTURE OF LUBRICATING OIL

Fred C. Toettcher, Fishkill, and John R. Coley, Beacon, N. Y., assignors to The Texas Company, New York, N. Y., a corporation of Delaware Application May 4, 1945, Serial No. 592,054

4 Claims. (Cl. 196—147)

This invention relates to the treatment of hydrocarbon oils to produce lubricating oil highly resistant to oxidation. The invention is concerned with improvements in the treatment of lubricating stocks to effect increase in oxidation stability and to produce oils of highly stable character adapted for turbine oils, lubricating oils for internal combustion engines and the like.

In accordance with the invention the oil is subjected to catalytic treatment in contact with certain catalysts under selected conditions of temperature under which reactions occur which produce pronounced increases in the oxidation stability of the oil. The catalyst promotes reactions in which the structures of the lubricating oil molecules which are relatively unstable to oxidation are modified to more stable structures, structures which inhibit the oxidation of a lubricating oil, or to structures which may readily be removed from the oil by simple means such as distillation. The lubricating oil as a whole is rendered more oxidation stable by the treatment. While it is difficult to determine the exact nature of the reactions occurring in the treatment it appears that in general there is some increase in both aromaticity and paraffinicity apparently at the expense of naphthenic rings.

The catalysts which produce the increase in oxidation stability comprise certain composites of silica and alumina and include generally the activable clays, particularly the non-swelling, acid-treated montmorillinite or bentonitic clays. Industrial activated clays which have been found particularly effective for the practice of the invention are Super Filtrol and Lena Clay, each of which is a non-swelling, acid-treated bentonitic clay.

In accomplishing the improvement in oxidation stability the lubricating stock is contacted with the catalyst in pulverulent, comminuted or powdered form at temperatures upwards of 600° F. and generally within a range of about 650-725° F. with a time of reaction of about one-half an hour up to one or two hours. As the temperature is increased above 600° F. the reactions catalyzed by the catalyst become very active. While the extent of improvement in oxidation stability increases generally as the temperature of treatment is raised we have found that there is a critical temperature for each stock beyond which a small increase in temperature results in very greatly increased stability. These critical temperatures are found to be within the range of about 625-675° F. In reference to the upper limit of temperature it may be stated that it is advisable to employ temperatures sufficiently low that the oil being treated may remain substantially in the liquid phase. If the temperature is unduly increased, coking is apt to occur and mechanical difficulties such as a tendency for the catalyst to settle out may be encountered. Moreover as the temperature is increased there is a greater danger of having thermal cracking at the expense of the desired selective catalytic conversion. In view of these considerations the upper limit of temperature is about 750° F. and generally for all stocks a temperature of about 650° F. to 725° F. is the most satisfactory. The contact time preferably approximates one half an hour to one hour. The response of paraffinic stocks to the catalytic treatment is better than the response of naphthenic stocks.

In practicing the invention thermal cracking is avoided and the conditions of the catalytic conversion are restricted so as to avoid any material conversion into low boiling products such as gasoline. In the conversion reactions in which a pronounced increase in oxidation stability is accomplished there will be a certain amount of conversion into products of lower viscosity than that of the starting material. Thus in treating a lubricating stock of say 500/100° F. Saybolt Universal viscosity, sufficiently to obtain an adequate increase in oxidation stability there will be formed some quantities of lighter viscosity lubricating oil and smaller proportions of oil of the character of gas oil or possibly kerosene. We have found however that by means of our process it is possible to obtain satisfactory increases in oxidation stability with yields around 65-80% of product of the same viscosity as that of the oil treated.

The invention is particularly adapted for the treatment of refined lubricating stocks to effect the improvement in oxidation stability. In the treatment of oils for certain purposes we have found that the sequence in which the catalytic treatment is applied in respect to other refining steps is of a critical nature. Thus in the production of turbine oils, which are required to have a high oxidation stability and also must be resistant to emulsion or must readily separate from emulsions which may be produced in the use of the oil, it is necessary that the catalytic treatment be applied after the oil has been subjected to refining treatments, such as acid treatment and solvent refining. We have found that, if the oil, after being given the catalytic treatment, be subjected to after-treatments such as sulfuric acid treating, solvent refining, caustic washing and similar treatments, while the emulsion characteristics of the oil may be improved the after-treating tends to greatly reduce the oxidation stability imparted to the oil by the catalytic treatment. Accordingly in the production of an oil which will have both high oxidation stability and good emulsion characteristics it is critical that the catalytic treatment for improvement in oxidation stability follow the other refining treatments. The catalytically treated oil may, however, be subjected to filtration through clay or fuller's earth at moderate temperature for improvement in color without impairing its quality for turbine oil.

In describing the invention in detail reference is made to the drawings which illustrate typical results obtainable by the invention and wherein:

Fig. 1 is a graph showing the effect of temperature in improving the oxidation stability test life of the oil.

Fig. 2 is a graph showing the effect of different amounts of catalyst in effecting the improvement in oxidation stability.

Fig. 3 is a graph showing the relation between yield of product and oxidation stability improvement when using different amounts of catalyst.

Figure 4:
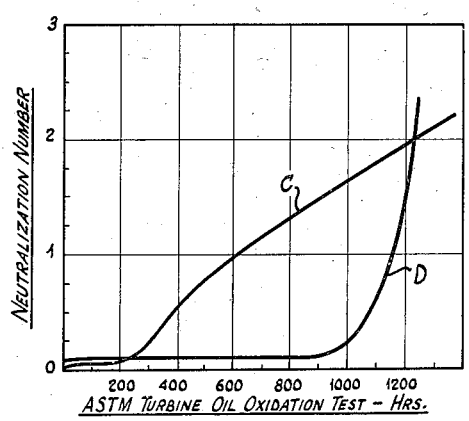
Fig. 4 is a graph showing a comparison of a catalytically treated oil and an inhibited oil.

In obtaining the data plotted in Fig 1 a naphthenic pale oil stock having a Saybolt Universal viscosity of 500/100° F. was treated with 10% by weight of Super Filtrol. The temperatures of the treatments are plotted against the oxidation test life in hours of the recovered product of 500/100° F. viscosity, as determined by the A. S. T. M. turbine oil oxidation test. The test life is expressed as the number of hours required for the oil to reach a neutralization number of 2. Curve A represents the results obtained with a contact time of 63 minutes and curve B represents the results obtained with a contact time of 32 minutes. It will be seen that for each curve there is a critical temperature beyond which a small increase in temperature results in greatly increased stability, this temperature approximating 650° F. for curve A and approximating 665° F. for curve B, which indicates that to obtain optimum results the temperature applied should approximate these temperatures or exceed them. The optimum operating temperature for this stock is about 710° F.–730° F. with 32 minutes contact time and about 685° F.–710° F. with 63 minutes contact time.

In obtaining the data plotted in Fig. 2 the 500 Pale Oil was subjected to catalytic treatment in contact with Super Filtrol at a temperature of 700° F. with 32 minutes contact time and with varying amounts of catalyst. In the drawing the percentages by weight of catalyst are plotted against the oxidation test life in hours of the products having the same viscosity as that of the oil treated. It will be seen that from a point approximating 8–10% of catalyst the curve rises very steeply. Practical considerations involved in handling the mixture of oil and catalyst will generally place the upper limit of catalyst at around 20%. It may be stated that variations in the proportion of catalyst produce the best oxidation stability improvement for the smallest decrease in yield, the varying of the clay dosage being superior in this respect to variations in temperature or in contact time.

In the runs furnished the data for Fig. 3 the 500 Pale Stock was treated with Super Filtrol at 710° F. and 32 minutes contact time using varying proportions of the catalyst. In the graph the yield of treated oil of 500 viscosity is plotted against the oxidation test life. The different percentages of catalyst used namely, 2½%, 5%, 10%, 15% and 20% are indicated on the curve.

In a typical example, the invention was applied to the treatment of a lubricating distillate from a Gulf Coast naphthene base crude. The distillate from the crude stills was rerun with caustic soda in vacuum distillation, a 500 Pale Oil stock being taken as one of the fractions. The Pale Oil distillate was solvent refined with liquid sulfur dioxide and then treated with sulfuric acid and neutralized. The treated product of 500 viscosity constituted a high grade lubricating oil having for example the emulsion characteristics required for turbine oils; the A. S. T. M. oxidation test life of the oil was 75. This oil was contacted with Super Filtrol in a quantity amounting to 15% by weight of oil treated at a temperature of 665° F. and with a contact time of 32 minutes. The treated oil was cooled and the catalyst separated. The oil was vacuum distilled to remove the lower boiling components and produce a stripped product of 500 viscosity which constituted 65.7% of the oil which had been subjected to the catalytic treating. The product had an A. S. T. M. oxidation stability test life of 1560 hours. The overhead from the vacuum distillation was redistilled under vacuum to fractionate it into light lubricating oil, gas oil and kerosene (the latter having an initial boiling point of 406° F. and a 10% point of 422° F.). The oil occluded on the used catalyst was recovered, obtaining an additional quantity of 500 viscosity oil as well as some light lubricating oil, gas oil and kerosene. The oxidation test life of the recovered 500 viscosity oil was 1100 hours. The total yield of recovered products, except for a small quantity of gas, was as follows:

| | Per cent |
|---|---|
| Turbine oil (500 viscosity) | 66.5 |
| Light lubricating oil | 15.5 |
| Gas oil | 16.2 |
| Kerosene | 1.5 |

The catalytic treatment did not impair the emulsion characteristics of the oil so that the product was suitable for a high grade turbine oil.

In a second example, the invention was applied to the treatment of a paraffinic stock. A paraffin base crude was subjected to vacuum distillation and a distillate cut was acid treated and neutralized and then dewaxed by pressing. The pressed distillate was redistilled over caustic soda and a distillate thus obtained was acid treated, then solvent refined with liquid sulfur dioxide and finally subjected to anti-gravity filtration through fuller's earth. The treated product which had a viscosity of 145/100° F. was contacted by 10% by weight of Super Filtrol at a temperature of 650° F. for a period of 45 minutes. The product, stripped of light ends to 154 viscosity, was subjected to the A. S. T. M. oxidation stability test and at the end of 1336 hours the neutralization number was only 1.28. The emulsion test was satisfactory for turbine oil.

In another run with a paraffinic stock a paraffinic pale oil of 145 viscosity was obtained from a paraffin base crude in the same manner as that of the preceding pale oil stock. The oil was acid treated, neutralized and dewaxed by pressing, the pressed distillate was rerun over caustic and treated with sulfuric acid and neutralized. This oil was contacted with Super Filtrol in a quantity amounting to 10% by weight of the oil treated at a temperature of 650° F. and with a contact time of 32 minutes yielding a product of 145 viscosity amounting to 76% of the oil treated and having an A. S. T. M. oxidation stability test life of over 3024 hours. The oil satisfactorily met the emulsion tests for turbine oil.

In order to obtain the best results with the catalyst it should be dried at moderate temperatures prior to use. It is recommended that the clay catalyst be dried at temperatures of about 300–400° F. at which temperature the free water will be driven off while the water of combination will remain. Clay dried at these moderate temperatures is much superior in the process than when dried at high temperatures such for example, as 1600° F., a temperature adequate to remove the water of crystallization.

One feature of the invention involves the addition of an oxidation inhibitor to the catalytically treated oil. We have found that the catalytically treated product of improved oxidation stability is capable of further improvement in this respect by the addition of an inhibitor and that the combination of the catalytic treating and inhibiting produces a product which not only possesses increased oxidation stability but also produces a product the oxidation stability curve of which exhibits a long induction period characteristic of an inhibited product and the relatively gradual increase in acidity beyond the induction period characteristic of the curve of the catalytically treated product.

When inhibiting the product of the catalytic treatment various agents adapted to retard oxidation may be used. Among the materials adapted to function as oxidation inhibitors are: aromatic hydroxy compounds, such as the alkylated phenols, sulfur-containing organic compounds, such as phenol sulfides, thiocarbamate compounds and sulfurized oil compounds, and aromatic amino compounds, such as tetramethyldiamino-diphenylmethane, phenylalphanapthylamine and diphenylamine.

Figure 5:
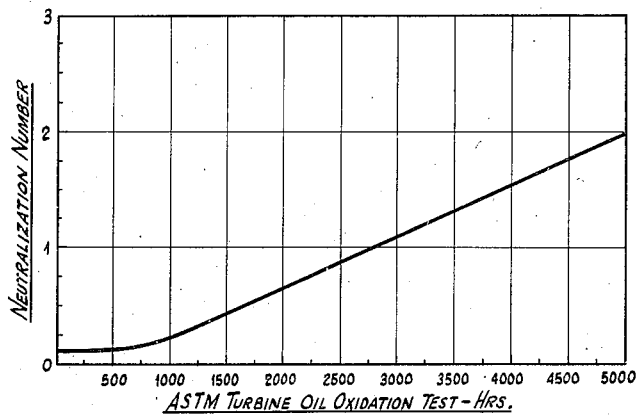
Fig. 5 is a graph showing the effect of inhibiting the catalytically treated oil.

Figs. 4 and 5 show the effect of inhibiting the catalytically treated product. In Fig. 4 the oxidation test life in hours is plotted against the neutralization number. Curve D is a typical curve of an inhibited turbine oil which had not received the catalytic treatment. The oil tested was a 500 viscosity oil, from a naphthene base crude, which had been solvent refined with liquid sulfur dioxide, acid treated, neutralized and filtered through fuller's earth. The oil was inhibited with tetramethyldiamino-diphenylmethane. It will be observed that the oil had a long induction period of some 900 hours after which the acidity increased very rapidly reaching a neutralization number of 2 at the end of about 1200 hours. In obtaining the data for curve C the same stock as that used for curve D was, following the filtering step, subjected to the catalytic treatment as described herein. No inhibitor was added to the catalytically treated oil. The resulting curve is typical of the catalytically treated product. It will be observed that the catalytically treated product had a relatively short induction period of about 250 hours and that after the induction period the rate of development of acidity was gradual being approximately linear with time. The curve of Fig. 5 is based on the catalytically treated product of curve C to which tetramethyldiamino-diphenylmethane has been added as an inhibitor. From the curve of the catalytically treated and inhibited oil it will be seen that the induction period has by the addition of the inhibitor been increased to about 750 hours and that beyond the induction period the increase in acidity is quite gradual, with the total life being greatly extended over either that of the inhibited oil (curve D) or the catalytically treated oil (curve C). Computing the rate of increase in acidity beyond the induction period for each of the three curves it will be seen that the rate per hour of increase in neutralization number is approximately as follows:

Curve D _____ .0088
Curve C _____ .0016
Curve of Fig. 5 _____ .00044

Thus the rate of increase in neutralization number beyond the induction period for the catalytically treated oil (curve C) is about 1/5 of the rate for the merely inhibited oil (curve D) and the rate for the catalytically treated and inhibited oil (Fig. 5 curve) is only about 1/20 of the rate for the merely inhibited oil.

When using the inhibitor it is sometimes desirable to subject the oil to moderate catalytic treatment, short of maximum oxidation stability improvement, thus reducing the treating loss to a minimum and then to add the inhibitor to the moderately improved oil. Thus for example a refined paraffinic lubricating oil of 82 A. S. T. M. oxidation stability test was treated with Super Filtrol at a temperature of 600° F. for a period of three-quarters of an hour to yield a product of 480 A. S. T. M. oxidation stability test and a refined naphthenic lubricating oil of 80 hours oxidation stability was treated with the same catalyst and under the same conditions to produce a product of 500 hours oxidation stability. Both of these products were inhibited with 0.03% oxidized wax and 0.1% tetramethyldiamino-diphenylmethane. The inhibited products had oxidation stability tests of 990 hours and 1050 hours, respectively.

In practicing the invention the oil and catalyst may be subjected to reaction in various types of apparatus. However a preferred operation is to pass a mixture of oil and catalyst through a carefully regulated heating coil and to either quench the effluent or to pass it through a cooler adapted for rapid cooling, so as to thus accurately control the time of reaction. It is preferred to add the catalyst to the oil with the oil at normal temperature or at least after only moderate preheating so as to eliminate the effect of any strictly thermal reaction.

The oil product is fractionated to separate it into the fractions desired. For example, in one method of operation contemplated by the invention the catalytic treatment may be applied to a relatively high viscosity stock such as 750/100° F. viscosity pale oil and the product fractionated to obtain a 500 viscosity oil suitable for turbine oil.

Although a preferred embodiment of the invention has been described herein, it will be understood that various changes and modifications may be made therein, while securing to a greater or less extent some or all of the benefits of the invention, without departing from the spirit and scope thereof.

We claim:

1. In the manufacture of turbine oils of superior emulsion resistant and oxidation stability properties the process that comprises first subjecting a lubricating distillate oil to treatments involving solvent refining and acid treating and neutralizing to thereby produce a product having emulsion resistant properties adapted for turbine oil, and then contacting the solvent-refined and acid-treated and neutralized oil with activated clay in a quantity amounting to not less than about 10% by weight of the oil treated at a temperature of 650–750° F. with a contact time of about ½–1 hour to thereby effect reactions involving an increase in aromaticity and formation of structures which inhibit oxidation and causing increased oxidation stability without impairing the emulsion resistant property and produce a finished product having both the emulsion resistant and oxidation stability properties adapted for turbine oil.

2. In the manufacture of turbine oils of superior emulsion resistant and oxidation stability properties the process that comprises first subjecting a lubricating distillate oil to treatments involving solvent refining and acid treating and neutralizing to thereby produce a product having emulsion resistant properties adapted for turbine oil, and then contacting the solvent-refined and acid-treated and neutralized oil with activated clay in a quantity amounting to not less than about 10% by weight of the oil treated with a contact time within the range of about ½–1 hour at a temperature within a range from a minimum of 650° F. for a contact time of 1 hour and from a minimum of 665° F. for a contact time of ½ hour up to a maximum of about 750° F. to thereby effect reactions involving an increase in aromaticity and formation of structures which inhibit oxidation and causing increased oxidation stability without impairing the emulsion resistant property to thereby produce a finished product having both the emulsion resistant and oxidation stability properties adapted for turbine oil.

3. In the manufacture of turbine oils of superior emulsion resistant and oxidation stability properties the process that comprises first subjecting a lubricating distillate oil to treatments involving solvent refining and acid treating and neutralizing to produce an oil of a given viscosity and having emulsion resistant properties adapted for turbine oil, then treating the solvent-refined and acid-treated and neutralized oil with activated clay in a quantity amounting to not less than about 10% by weight of the oil treated at a temperature of 650–750° F. with a contact time of about ½–1 hour to thereby effect reactions involving an increase in aromaticity and formation of structures which inhibit oxidation and causing increased oxidation stability without impairing the emulsion resistant property and distilling off from the resultant product lower boiling constituents to obtain as residue a finished product of approximately the same viscosity as the oil before the clay contacting and having both the emulsion resistant and oxidation stability properties adapted for turbine oil.

4. In the manufacture of turbine oils of superior emulsion resistant and oxidation stability properties from lubricating distillate obtained from paraffin base crude the process that comprises subjecting the paraffin lubricating distillate to dewaxing, subjecting it to acid treating and neutralizing both before and after the dewaxing and then contacting the dewaxed and double acid-treated and neutralized oil with activated clay in a quantity amounting to not less than about 10% by weight of the oil treated at a temperature of 650–750° F. with a contact time of about ½–1 hour to thereby effect reactions involving an increase in aromaticity and formation of structures which inhibit oxidation and causing increased oxidation stability without impairing the emulsion resistant property and produce a finished product having both emulsion resistant and oxidation stability properties adapted for turbine oil.

FRED C. TOETTCHER.
JOHN R. COLEY.

REFERENCES CITED

The following references are of record in the file of this patent:

UNITED STATES PATENTS

| Number | Name | Date |
|---|---|---|
| 1,547,682 | Puitzman | July 28, 1925 |
| 1,655,175 | Benjamin | Jan. 3, 1928 |
| 1,766,338 | Johnston | June 24, 1930 |
| 1,786,493 | Isom et al. | Dec. 30, 1930 |
| 1,813,628 | Lowery et al. | July 7, 1931 |
| 1,856,934 | Stafford | May 3, 1932 |
| 1,884,587 | Darlington | Oct. 25, 1932 |
| 1,898,168 | Belden | Feb. 21, 1933 |
| 1,970,796 | Beiswenger | Aug. 21, 1934 |
| 2,222,475 | Brandt | Nov. 19, 1940 |
| 2,273,147 | Schumacher et al. | Feb. 17, 1942 |
| 2,340,947 | Evans et al. | Feb. 8, 1944 |
| 2,341,874 | Lovell | Feb. 15, 1944 |
| 2,356,952 | Smith | Aug. 29, 1944 |
| 2,420,108 | Strathford et al. | May 6, 1947 |